UNITED STATES PATENT OFFICE.

THOMAS A. EDISON, OF LLEWELLYN PARK, WEST ORANGE, NEW JERSEY, ASSIGNOR TO EDISON STORAGE BATTERY COMPANY, OF WEST ORANGE, NEW JERSEY, A CORPORATION OF NEW JERSEY.

PRODUCTION OF NICKEL HYDROXID.

1,167,484. Specification of Letters Patent. Patented Jan. 11, 1916.

No Drawing. Application filed April 8, 1911. Serial No. 619,674.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in the Production of Nickel Hydroxid, of which the following is a specification.

The object of my invention is to cheapen the cost of production of nickel hydroxid for use in alkaline storage batteries and to improve the product for such use.

In the ordinary method of producing nickel hydroxid, the nickel hydroxid is precipitated from an aqueous solution, only a slight excess of alkaline hydroxid being used, and then washed and dried. This method involves the use of apparatus of large capacity in proportion to the output, and since the precipitated pulp is in a semi-colloidal form, the operation of washing and drying is tedious and expensive. In my improved process, the tedious and expensive operation of washing out the soluble products of reaction while the precipitate is in a semi-colloidal form is eleminated, and at the same time a nickel hydroxid or hydrate is produced which is more efficient as an active element in electrodes of alkaline storage batteries.

The nickel hydroxid produced by my improved process is apparently in a different physical condition from or is more porous than nickel hydroxid produced in the ordinary way. It has an increased capacity per gram to store oxygen, and being easily crumbled or friable a greater weight of it may be loaded or compressed into a given space. For instance, in a single tube, the amount of nickel hydroxid packed in with a given weight of plunger with the hydroxid made in the ordinary manner is 5.78 grams; whereas, with the hydroxid of nickel made by this process, the weight is 6.29 grams. Furthermore, each gram of my improved product provides a battery capacity of about 250 milliamperes as compared with about 200 milliamperes per gram of the hydroxid made in the ordinary manner. These properties are of particular advantage when the product is used in alkaline storage batteries, because an increased battery capacity or output is obtained both by the increased weight of the nickel hydroxid loaded into the tubes or other containers of the electrode, and by the increased capacity per gram of the material to store oxygen.

In order to carry my invention into effect, I proceed substantially as follows:— A standardized solution of sodium hydroxid is prepared into which a standardized quantity of nickel sulfate is poured slowly while the mixture is being stirred or otherwise agitated, until the proper amount of nickel sulfate has been added. I have found that in manufacturing nickel hydroxid for use in alkaline storage batteries, it is advantageous to use a considerable excess of alkali over the amount generally used, the porosity or other changes in physical structure of the nickel hydroxid finally produced being proportionate to the excess of alkali, and the amount which can be loaded in the tube increasing with an increased percentage of free alkali present when the slow drying hereinafter described takes place. The best hydroxid as regards loading weight to suit our present conditions is produced by using an excess of about 8% of free alkali over the amount required theoretically to precipitate all the sulfate, and if a greater loading weight is required, the percentage of free alkali may be increased. The precipitated pulp together with the reaction liquor is then evaporated down until it attains the consistency of cream, and this cream-like mixture is run into pans where it is dried slowly, the drying extending preferably over a period of about ten days. The operation of drying may be carried on in partially closed vessels in order to render the drying very slow. The drying may be carried on more rapidly, but I have found that slow drying is essential for the best results. For example, if the drying takes place rapidly, the resulting nickel hydroxid is not capable of being packed into such a small space as if the drying had been carried on more slowly. Apparently, some advantageous change in the physical structure of the product is produced by the slow drying. The dried material which is readily broken into granular form, and which contains the soluble reaction product which, in this case, is principally sodium sulfate, and the free sodium hydroxid is put into a percolator and water passed through it until only a trace of the sulfate or alkali is left. This residue is then dried, and after being crushed and screened in order to obtain a material of proper size, is ready for use in the positive electrodes of alkaline storage batteries.

It is to be noted that in my improved method nickel hydroxid is formed and dried in intimate commixture with a soluble substance, which said soluble substance is subsequently removed.

A great advantage of my improved process is the rapidity and ease with which the sodium sulfate can be washed out, thereby avoiding the use of large quantities of distilled water and the great loss of time consumed in waiting for the settling of the pulp after each washing. Furthermore, by this method, a nickel hydroxid is produced whose physical condition, because of porosity or other change in structure, is more suitable for high battery output or capacity than nickel hydroxid made in the usual manner. The degree of porosity or other change in physical structure may be controlled by varying the percentage of excess alkali. In the process which I have described, the principal soluble reaction product is sodium sulfate, and in the practice of this process a concentrated solution of sodium sulfate is obtained which constitutes a valuable by-product. In fact, a considerable portion of the sodium sulfate is washed out in a saturated solution from which the sodium sulfate crystallizes without necessity of further evaporation. I may also find it advantageous or desirable to draw off a portion of the reaction liquor or supernatant liquid after the precipitate has settled and before evaporating the mixture down to the point where it is to be dried, instead of evaporating all of the liquid, as hereinbefore described.

Other soluble salts of nickel or a mixture of such salts may be employed instead of nickel sulfate, and other soluble hydroxids or a mixture of such hydroxids instead of sodium hydroxid.

I have also found that by using very concentrated solutions of the nickel salt and the hydroxid, the amount of water to be evaporated may be materially reduced, and a mixture of cream-like consistency obtained before evaporation. This cream-like mixture is dried very slowly and otherwise treated in the manner hereinbefore described.

Having now described my invention, what I claim as new and desire to secure by Letters Patent is as follows:—

1. The method of manufacturing nickel hydroxid which consists in precipitating nickel hydroxid from a solution of a nickel salt, drying the precipitate together with a soluble reaction product or products, and washing the precipitate to remove the soluble reaction product or products, substantially as described.

2. The method of manufacturing nickel hydroxid which consists in precipitating nickel hydroxid from a solution of a nickel salt, drying the precipitate together with a soluble reaction product or products, washing the precipitate, and drying the residue, substantially as described.

3. The method of manufacturing nickel hydroxid which consists in mixing together solutions of a nickel salt and a hydroxid whereby a precipitate of nickel hydroxid is obtained, evaporating the precipitated pulp together with some or all of the soluble reaction products to dryness, washing the residue and redrying, substantially as described.

4. The method of manufacturing nickel hydroxid for use in alkaline storage batteries which consists in precipitating nickel hydroxid by mixing solutions of a nickel salt and a predetermined considerable excess of alkaline hydroxid over the amount necessary to effect complete precipitation, evaporating the precipitated pulp together with excess alkali and a reaction product or products to dryness, removing the excess alkali and the soluble reaction product or products by washing, and drying the residue, substantially as described.

5. The method of manufacturing nickel hydroxid which consists in precipitating nickel hydroxid from a solution of a nickel salt, evaporating the precipitated pulp together with a soluble reaction product or products until a cream-like consistency is attained, slowly drying the cream-like mixture, washing the dried mixture and redrying the residue, substantially as described.

6. The method of manufacturing nickel hydroxid for use in alkaline storage batteries, which consists in mixing solutions of a nickel sale and a predetermined considerable excess of alkaline hydroxid over the amount necessary to effect complete precipitation, evaporating the precipitated pulp together with another reaction product or products and excess alkali until a cream-like consistency is attained, slowly drying the cream-like mixture, removing the excess alkali and the soluble reaction product or products by washing, and drying the residue, substantially as described.

7. An active material for a storage battery electrode containing nickel hydroxid rendered porous and friable by the removal of a soluble substance therefrom after said hydroxid has been formed and dried in intimate commixture with said soluble substance, substantially as described.

8. A method of producing active material for storage batteries, which consists in forming and drying an insoluble hydroxid in intimate commixture with a soluble substance, and subsequently removing the soluble substance, substantially as described.

9. A method of producing active material for storage batteries, which consists in forming and drying nickel hydroxid in intimate commixture with a soluble substance, and subsequently removing the soluble substance, substantially as described.

10. An active material for a storage battery electrode containing nickel hydroxid having substantially the same packing and battery capacity as the product remaining after forming and drying nickel hydroxid in intimate commixture with a soluble substance and thereafter removing the soluble substance, substantially as described.

11. Nickel hydroxid having the same physical and electro-chemical properties as the product remaining after forming and drying nickel hydroxid in intimate commixture with a soluble substance and thereafter removing the soluble substance, substantially as described.

This specification signed and witnessed this 7th day of April, 1911.

THOS. A. EDISON.

Witnesses:
HENRY LANAHAN,
ANNA R. KLEHM.

Correction in Letters Patent No. 1,167,484.

It is hereby certified that in Letters Patent No. 1,167,484, granted January 11, 1916, upon the application of Thomas A. Edison, of Llewellyn Park, West Orange, New Jersey, for an improvement in "Production of Nickel Hydroxid," an error appears in the printed specification requiring correction as follows: Page 2, line 111, claim 6, for the word "sale" read *salt;* and that the said Letters Patent should be read with this correction therein that the same may conform to the record of the case in the Patent Office.

Signed and sealed this 25th day of April, A. D., 1916.

[SEAL.]

J. T. NEWTON,
*Acting Commissioner of Patents.*

Cl. 204—29.